United States Patent
Duyaguit

(10) Patent No.: US 9,471,567 B2
(45) Date of Patent: Oct. 18, 2016

(54) AUTOMATIC LANGUAGE RECOGNITION

(71) Applicant: NCR Corporation, Duluth, GA (US)

(72) Inventor: Arnil Guron Duyaguit, Saint Bernard (PH)

(73) Assignee: NCR CORPORATION, Duluth, GA (US)

( * ) Notice: Subject to any disclaimer, the term of this patent is extended or adjusted under 35 U.S.C. 154(b) by 421 days.

(21) Appl. No.: 13/754,987

(22) Filed: Jan. 31, 2013

(65) Prior Publication Data

US 2014/0214400 A1 Jul. 31, 2014

(51) Int. Cl.
*G06F 17/28* (2006.01)
*G06F 17/27* (2006.01)
*G10L 15/00* (2013.01)
*G10L 15/20* (2006.01)
*G10L 15/22* (2006.01)

(52) U.S. Cl.
CPC ........... *G06F 17/289* (2013.01); *G06F 17/275* (2013.01); *G10L 15/005* (2013.01); *G10L 15/20* (2013.01); *G10L 2015/225* (2013.01)

(58) Field of Classification Search
CPC ... G10L 15/005; G06F 17/289; G06F 17/275
See application file for complete search history.

(56) References Cited

U.S. PATENT DOCUMENTS

| | | | | |
|---|---|---|---|---|
| 6,061,646 | A * | 5/2000 | Martino et al. | 704/3 |
| 7,548,846 | B1 * | 6/2009 | Monster | 704/8 |
| 7,778,948 | B2 * | 8/2010 | Johnson et al. | 706/45 |
| 8,494,838 | B2 * | 7/2013 | Donabedian | G06F 17/289 704/8 |
| 9,015,032 | B2 * | 4/2015 | Daye et al. | 704/8 |
| 2002/0082844 | A1 * | 6/2002 | Van Gestel | 704/275 |
| 2002/0111146 | A1 * | 8/2002 | Fridman et al. | 455/99 |
| 2004/0243392 | A1 * | 12/2004 | Chino et al. | 704/7 |
| 2006/0206331 | A1 * | 9/2006 | Hennecke et al. | 704/254 |
| 2008/0300880 | A1 * | 12/2008 | Gelbman | 704/256 |
| 2010/0049520 | A1 * | 2/2010 | Stewart et al. | 704/257 |
| 2010/0198579 | A1 * | 8/2010 | Cunnington et al. | 704/3 |
| 2010/0280828 | A1 * | 11/2010 | Fein et al. | 704/246 |
| 2012/0004899 | A1 * | 1/2012 | Arshi | G06Q 30/02 704/8 |
| 2013/0030789 | A1 * | 1/2013 | Dalce | 704/2 |
| 2013/0165151 | A1 * | 6/2013 | Gits | H04W 4/023 455/456.3 |
| 2013/0238336 | A1 * | 9/2013 | Sung et al. | 704/255 |

* cited by examiner

*Primary Examiner* — Brian Albertalli
(74) *Attorney, Agent, or Firm* — Schwegman, Lundberg & Woessner

(57) ABSTRACT

Techniques for automatic language recognition are provided. A device having an interfaced microphone detects conversations occurring in proximity to the device. The conversations are resolved to a specific spoken language. Information communicated from or on the device is then updated to be consistent with the spoken language. This language transition for the device is achieved automatically and without any affirmative action on the part of a user or administrator associated with the device.

20 Claims, 3 Drawing Sheets

AUTOMATIC LANGUAGE RECOGNITION

BACKGROUND

Consumers are increasingly using a variety of devices to interact with retailers. For example, consumers routinely research a retailer online before engaging a retailer in business. Nowadays, consumers can even use their own smartphones and tablet devices as kiosks to conduct business with enterprises and redeem offers.

Moreover, businesses now deploy digital signage in efforts to reach and interact with their consumers. A digital sign is a form of electronic display that can present multimedia on demand. Digital signs can be found in all types of environments and in some cases the digital signs can also be used as kiosks that consumers interact with.

So, both consumers and businesses are using new technology and devices to interact and communicate with one another. The challenge for businesses is how to entice these consumers, develop brand loyalty, and customize services in the new technology era where competitors are everywhere and always trying to steal consumers away from the businesses.

One particular area of concern is that which is related to a consumer's spoken language. This is so, because countries are increasingly becoming multi-lingual. For example, consider that some events in Miami Fla. may attract a large Spanish speaking population; the population is American but predominately speaks Spanish. On a different day, a same venue in Miami Fla. may attract an English speaking population; the population of which is still American. A business with digital signs and/or devices (such as kiosks and the like) at the venue wants to advertise and interact with the crowds at that Miami venue on the different dates in a manner that is preferred and understood by those crowds. Yet, manually reconfiguring the display presentations and/or software on the devices to provide the appropriate language for the different crowds can be cost prohibitive. Thus, one crowd on its date at the venue may be lost for the business because of an inaccurate language being used in displays and on devices on that date for the crowd present.

This previous presented example is but one scenario where a crowd's predominately spoken language can be a tremendous obstacle in a business's desire to properly communicate and reach consumers, other situations exists as well where language becomes a barrier in technology being used by businesses in their attempts to reach their consumers.

SUMMARY

In various embodiments, techniques for automatic language recognition are presented. According to an embodiment, a method for automatic language recognition is provided.

Specifically, audio is detected in proximity to a microphone; the audio is filtered to detect speech. Next, an original written language presented with information on a digital display is translated to a target written language associated with a spoken language, which is resolved for the detected speech.

DETAILED DESCRIPTION

Figure 1:
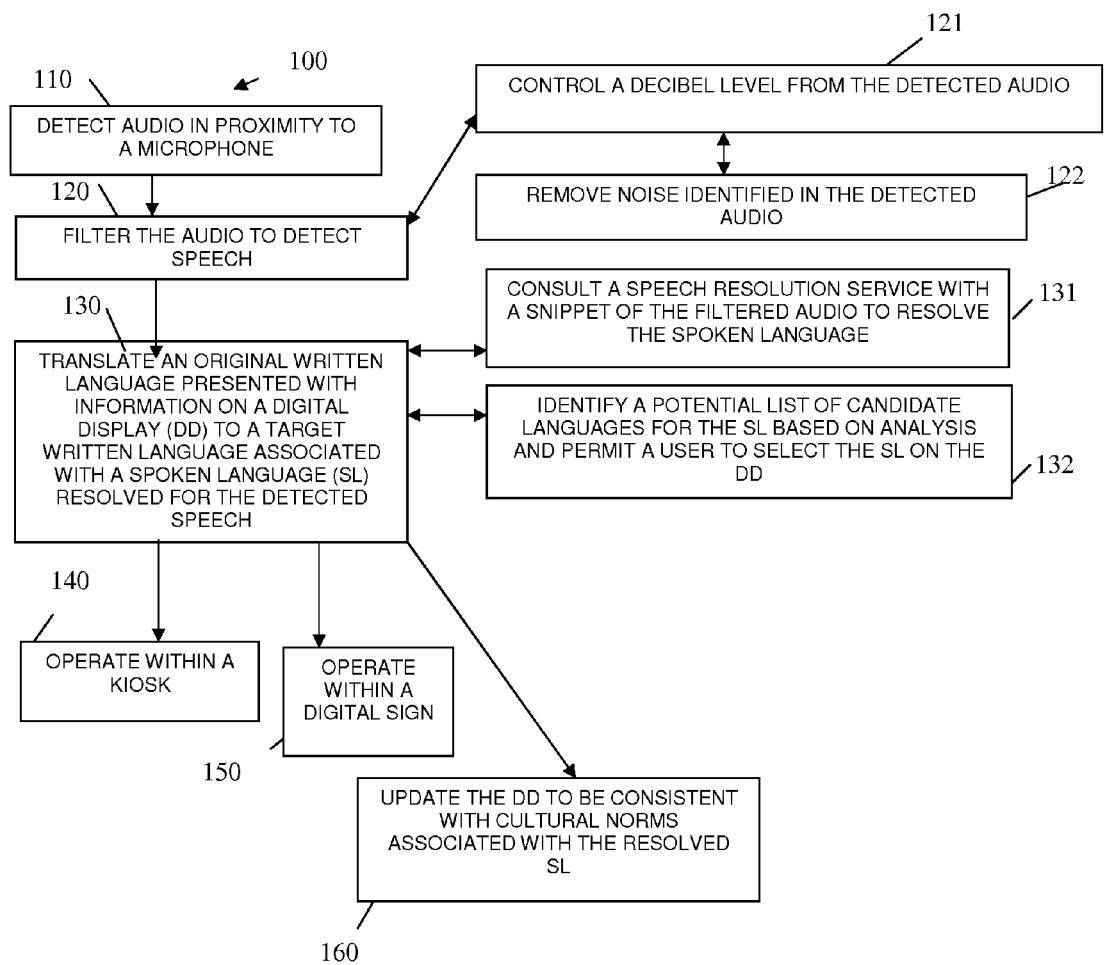
FIG. 1 is a diagram of a method for automatic language recognition, according to an example embodiment.

FIG. 1 is a diagram of a method 100 for automatic language recognition, according to an example embodiment. The method 100 (hereinafter "language translator") is implemented as instructions programmed and residing in memory and/or on a non-transitory computer-readable (processor-readable) storage medium and executed by one or more processors of a device. The processors are specifically configured and programmed to process the language translator. In an embodiment, the language translator may also operate over a network. The network is wired, wireless, or a combination of wired and wireless.

The use of the phrase "spoken language" as used herein refers to a human spoken and written language. So, in this context, any use of the term "language" herein refers to a spoken or written language and does not refer to a computer programming language.

A "device" as used herein includes any machine or composite machine (multiple devices or functions) having one or more processors, memory, and/or storage. The processors, memory, and/or storage cooperate to process executable instructions to provide services, such as the novel methods and mechanisms discussed herein and below.

At 110, the language translator detects audio in proximity to a microphone. The microphone is integrated into or interfaced with the digital display (kiosk, digital sign, etc.).

At 120, the language translator filters the audio to detect speech. That is, the audio detected in a configured proximity of the microphone is filtered to better make a determination about a spoken language being spoken by the people surrounding or within the configured proximity to the microphone. The speech can be associated with a single person, maybe on a phone by himself or herself, or my multiple people conversing with each other or multiple different groups each having their own independent conversations.

According to an embodiment, at 121, the language translator controls a decibel level from the detected audio. This permits for more accuracy as well when recognizing the speech.

Continuing with the embodiment of 121 and at 122, the language translator removes noise identified in the detected audio. Noise can be identified via software mechanism as things not associated with human speech or distant speech that is nearly inaudible. These frequencies can be removed to get a clearly picture of the speech occurring in the configured proximity to the microphone.

At 130, the language translator translates an original written language presented with information on a digital display to a target written language associated with a spoken language, which is resolved for the detected speech. In other words, written communication presented on the digital display is translated to a resolved spoken language associated with the filtered speech.

According to an embodiment, at 131, the language translator consults a speech resolution service with a snippet of the filtered audio to resolve the spoken language. Here, the device processing the language translator makes a network consultation with a third-party remote service providing the audio snippet, which the remote service resolves to the spoken language. So, the language translator can offload resolution of the spoken language.

In an embodiment, at 132, the language translator identify a potential list of candidate languages for the spoken language based on analysis and permit a user to select the spoken language on the digital display. So, the language translator narrows choices for the spoken language to a small subset and permits a user to select the proper language my either voice selections or on-screen selections. Each member of the list presented in its native language to the user. In some cases, the selection can be made on a device of the user, such as a phone or tablet that wireless communicates with the device of the language translator.

According to an embodiment, at 140, the language translator is operated as a service within a kiosk.

In another case, at 150, the language translator is operated as a service within a digital sign.

In yet another situation, at 160, the language translator updates the digital display to have content that is consistent with cultural norms and mores associated with a culture for the resolved spoken language. So, as an example, some images may be inappropriate in some cultures and such images can be changed to be culturally acceptable within the digital display based on the culture for the resolved spoken language.

Figure 2:
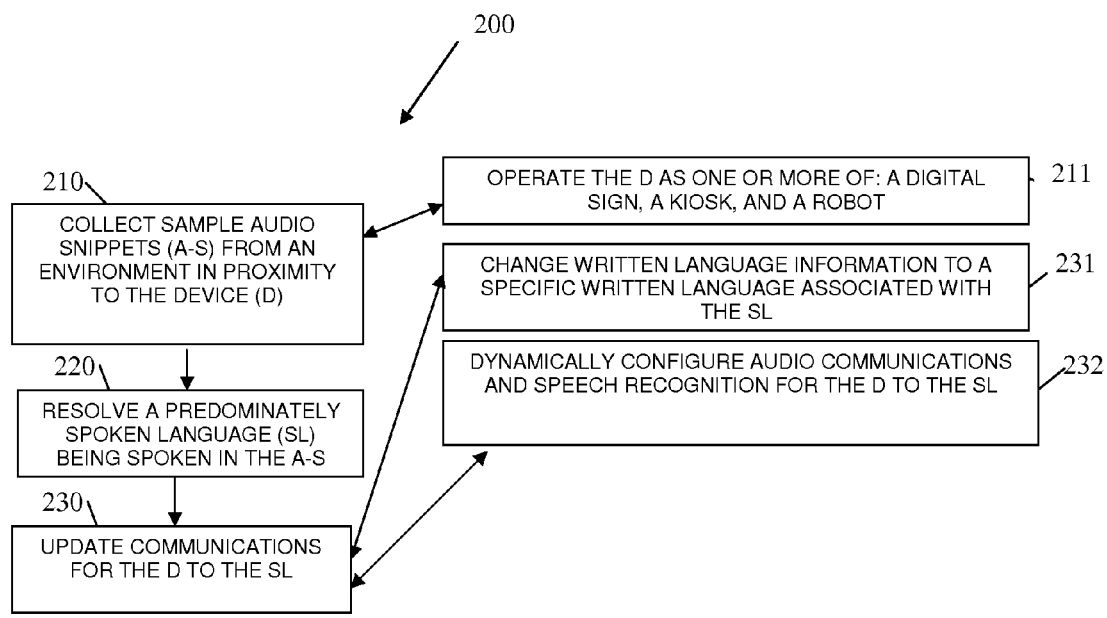
FIG. 2 is a diagram of another method for automatic language recognition, according to an example embodiment.

FIG. 2 is a diagram of another method 200 for automatic language recognition, according to an example embodiment. The method 200 (hereinafter "language updater") is implemented as instruction and programmed within memory and/or a non-transitory computer-readable (processor-readable) storage medium that executes on one or more processors of a device; the processors of the device are specifically configured to execute the language updater. The language updater, in some embodiments, is also operational over a network; the network is wireless, wired, or a combination of wired and wireless.

The language updater shows another and in some ways an enhanced perspective of the language translator, discussed in detail above with reference to the FIG. 1.

At 210, the language updater collects sample audio snippets from an environment in proximity to the device that processes the language updater.

According to an embodiment, at 211, the language updater operates on the device, which can be one or more of: a kiosk, a digital sign, and a robot.

At 220, the language updater resolves a predominately spoken language being spoken in the audio snippets collected at 210.

At 230, the language updater updates communications for the device to the resolved spoken language. Communications can be audio and/or visual.

For example, at 231, the language updater changes written language information to a specific written language associated with the resolved spoken language.

In another case, at 232, the language updater dynamically configures audio communications and speech recognition for the device to the resolved spoken language.

The device can recognize speech, provide speech communication, present written information, and/or communicate via visual content. All these various mechanisms are updated based on the resolved spoken language. Moreover, in cases where the device is a robot, all forms of the communication can be provided by the robot in the spoken language or in culturally acceptable ways. Still further, in the case where the device is a robot that robot may change gesture communications to be acceptable to cultural norms associated with the resolved spoken language.

Figure 3:
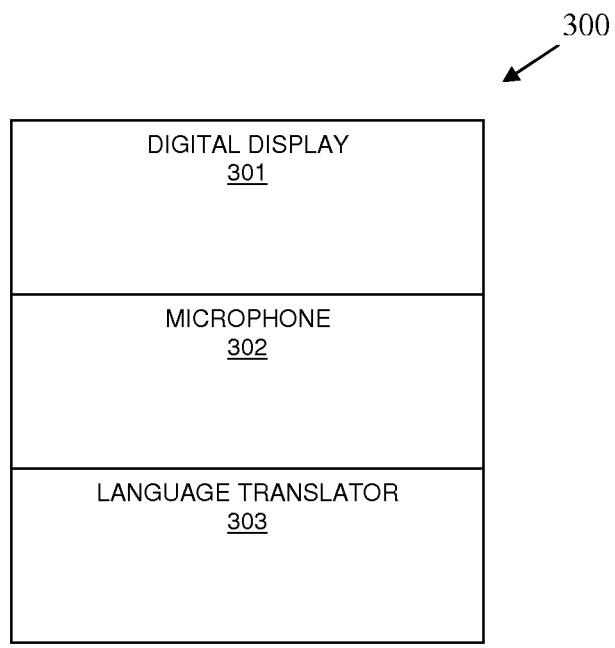
FIG. 3 is a diagram of an automatic language recognition system, according to an example embodiment.

FIG. 3 is a diagram of an automatic language recognition system 300, according to an example embodiment. The components of the automatic language recognition system 300 are implemented as executable instructions and programmed within memory and/or a non-transitory computer-readable (processor-readable) storage medium that execute on one or more processors of a device; the processors are specifically configured to execute the components of the automatic language recognition system 300. The automatic language recognition system 300 may also be operational over a network; the network is wired, wireless, or a combination of wired and wireless.

The automatic language recognition system 300 includes a digital display 301, a microphone 302, and a language translator 301. Each of these will now be discussed in turn.

The digital display 301 can include an integrated processor, memory, and/or storage. In an embodiment, the digital display 301 is a kiosk that interacts with consumers. In another case, the digital display 301 is a digital sign displaying advertisements and/or informational messages to consumers at a particular venue.

The microphone 302 may be integrated into the digital display 301 or may be independent of the digital display 301 but interfaced to or in communication with the digital display 301. The microphone 302 is configured to detect audio in a configured proximity to the digital display 301.

The automatic language recognition system 300 also includes one or more processors of a device (the device can be the digital display 301 or an independent device that includes the digital display 301 or is interfaced to or in communication with the digital display 301). The device has memory configured with the language translator 303; the language translator 303 executes on the one or more processors. Example processing associated with the language translator 303 was presented in detail above with reference to the methods 100 and 200 of the FIGS. 1 and 2, respectively.

The language translator 303 is configured to detect voice conversations in audio, which is in proximity to the microphone 302. The language translator 303 is also configured to resolve the voice conversations to a spoken language being used in those voice conversations. Furthermore, the language translator 303 is configured to use the resolved spoken language to translate written information presented on the digital display 301 from an original language to a target language associated with the spoken language.

According to an embodiment, the language translator 303 is also configured to filter noise from the voice conversations to improve an accuracy associated with resolving the spoken language.

In an embodiment, the language translator 303 is configured to consult a remote third-party service with an audio snippet from the voice conversations to resolve the spoken language.

In still another case, the language translator 303 is configured to present a predefined list of languages on the digital display 301 to permit a user interacting with the digital display 301 as a kiosk to select the spoken language. The predefined list narrowed by the language translator 303 by analyzing the voice conversations.

In one situation, the language translator 303 can present the predefined list on a mobile device of the user, such that the user selects the spoken language on the user's own mobile device (tablet, laptop, phone, etc.).

In yet another case, the language translator 303 is configured with a decibel control mechanism to adjust a decibel level for the voice conversations when resolving the spoken language. This may be particularly useful when the microphone 302 is picking up audio in a shouting crowd environment, such that controlling the decibel level can improve the accuracy of resolving the spoken language.

In an embodiment, the language translator 303 is configured to alter non-language information presented on the digital display 301 based on cultural norms or mores associated with the resolved spoken language. For example, images and/or video may include culturally offensive material/content that is adjusted based on the cultural associated with the resolved spoken language. Policies having rules with actions can define the changes based on the culture associated with the resolved spoken language.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A processor-implemented method programmed in memory and/or
a non-transitory processor-readable medium and to execute on one or more processors of
a device configured to execute the method, comprising:
detecting, on the device, audio in proximity to a microphone, wherein detecting further includes detecting the audio as speech from one of: a single person conversing on a phone in proximity to the microphone and multiple people conversing with one another in proximity to the microphone;
filtering, on the device, the audio to detect speech; and
translating, on the device, information originally being presented on a digital display in an original written language into a target written language identified for a spoken language and resolved for the detected speech, wherein the information is presented on the digital display in the target written language replacing the information presented on the digital display in the original written language, and modifying an original image presented on the digital display with a new image that is appropriate for a cultural of the spoken language.

2. The method of claim 1 further comprising, operating, on the device, the method within a kiosk.

3. The method of claim 1 further comprising, operating, on the device, the method within a digital sign.

4. The method of claim 1 further comprising, updating, via the device, the digital display to be consistent with cultural norms associated with the resolved spoken language.

5. The method of claim 1, wherein filtering further includes controlling a decibel level from the detected audio.

6. The method of claim 5, wherein controlling further includes removing noise identified in the detected audio.

7. The method of claim 1, wherein translating further includes consulting a speech resolution service with a snippet of the filtered audio to resolve the spoken language.

8. The method of claim 1, wherein translating further includes identifying a potential list of candidate languages for the spoken language based on analysis and permitting a user to select the spoken language on the digital display.

9. A processor-implemented method programmed in memory and/or a non-transitory processor-readable medium and to execute on one or more processors of a device configured to execute the method, comprising:
collecting, via the device, sample audio snippets from an environment in proximity to the device, wherein collecting further includes collecting the audio snippets from one of: a single person conversing on a phone in proximity to the device and multiple people conversing with one another in proximity to the device;
resolving, on the device, a predominately spoken language being spoken in the sample audio snippets; and
updating, on the device, communications associated with the device to the spoken language by providing the updated communications as written communication and information in the spoken language and translating original written communications presented on a display of the device into the written communication and the information for the spoken language on the display of the device, and modifying an original image presented on the display with a new image that is appropriate for a cultural of the spoken language.

10. The method of claim 9, wherein collecting further includes operating the device as one or more of a digital sign, a kiosk, and a robot.

11. The method of claim 9, wherein collecting further includes changing written language information to a specific written language associated with the spoken language.

12. The method of claim 9, wherein updating further includes dynamically configuring audio communications and speech recognition for the device to the spoken language.

13. A system, comprising:
a digital display;
a microphone integrated within or interfaced to the digital display; and
memory having a language translator that processes as executable instructions on one or more processors of the digital display;
wherein the language translator is configured to detect voice conversations in proximity to the microphone and resolve a spoken language for the voice conversations and in response thereto translating original written information presented on the digital display in an original language to a target language for the spoken language and presenting the written information and written communication in the target language on the digital display, wherein the voice conversations are obtained from one of: a single person conversing on a phone in proximity to the microphone and multiple people conversing with one another in proximity to the microphone, and wherein the language translator is further configured to modify an original image presented on the digital display with a new image that is appropriate for a cultural of the spoken language.

14. The system of claim 13, wherein the system is a kiosk.

15. The system of claim 13, wherein the system is a digital sign.

16. The system of claim 13, wherein the language translator is configured to filter noise from the voice conversations to improve accuracy associated with resolving the spoken language.

17. The system of claim 13, wherein the language translator is configured to consult a remote third-party service with an audio snippet from the voice conversations to resolve the spoken language.

18. The system of claim 13, wherein the language translator is configured to present a predefined list of languages on the digital display to permit a user interacting with the digital display as a kiosk to select the spoken language, the predefined list narrowed by the language translator by analyzing the voice conversations.

19. The system of claim 13, wherein the language translator is configured with a decibel control mechanism to adjust a decibel level for the voice conversations when resolving the spoken language.

20. The system of claim 13, wherein the language translator is configured to alter non-language information presented on the digital display based on cultural norms associated with the resolved spoken language.

\* \* \* \* \*